United States Patent Office 3,073,725
Patented Jan. 15, 1963

3,073,725
ION EXCHANGE PROCESSES
Karel Popper, Modesto, Calif., and Vladimir Slamecka, New York, N.Y.
No Drawing. Filed Dec. 1, 1960, Ser. No. 84,837
16 Claims. (Cl. 127—46)

This invention relates to ion exchange processes and is more particularly concerned with a process for removing impurities or contaminants from liquids and solutions by ion exchange.

This application is a continuation-in-part application of our copending application Serial No. 771,201, filed November 3, 1958, now abandoned.

While the invention is applicable to the removal of contamiants or impurities of polar and nonpolar nature from a wide variety of liquids and solutions, the invention will be particularly described in connection with the purification or defecation of sugar juice and related products and brackish or salt water, such as sea water.

A large number of processes have become known in which contaminants or other undesired constituents are exchanged or removed from liquids by ion exchange treatment. The prior art processes have in common that the cation exchange material and the anion exchange material, respectively, are charged and regenerated with separate functional groups comprising compounds or regenerants so that the ion exchange procedure and the charging and regeneration take place in two separate stages, i.e. the undesired cation contaminants are exchanged by the suitably charged cation exchange material or resin while the anion contaminants are exchanged in a separate step by contacting them with the suitably charged anion exchange resin.

It has been proposed to effect the exchange of both anions and cations in a single operation by providing mixed beds of anion and cation exchange material, but even in this case the anion and cation exchange materials are charged and regenerated by separate compounds. The prior art processes are thus cumbersome and time consuming and moreover are very costly as two different regenerants have to be used.

It is therefore one of the objects of this invention to provide a process for removing or exchanging cation and anion contaminants from a solution or liquid in a single step.

It is a further object of this invention to provide a method for charging or regenerating a mixed ion exchange material bed with a single agent or regenerant which is the source for both the cation and anion functional groups.

It is a still further object of this invention to provide an ion exchange process for the exchange of undesired cation and anion contaminants contained in a liquid, wherein the contaminants are exchanged in such a manner that an insoluble compound is formed in the liquid which may be easily removed from the latter, for example, by physical means such as filtration or centrifuging.

Many liquids containing polar contaminants, in addition also comprise a certain proportion of nonionic matter which floats in the liquid in the form of a suspension or dispersion. This, for example, applies to unrefined sugar solutions which contain both nonionic matter in suspension and polar impurities subject to ion exchange.

Ion exchange treatment of impure sugar solutions has been described in great detail in technical publications and has been actually carried out in industrial practice.

Its main object, as practiced, is to exchange melasogenic material naturally present in the crude juice for ions which will not inhibit the final recovery of the sugar content of the processed juice.

The juice is precolated through either separate cation and anion exchanger cells, or through a monobed consisting of a mixture of a cation and an anion exchanger. The cations present in the treated solution are exchanged for hydrogen and the anions for hydroxyl. This eliminates a very substantial part of the impurities in the form of water and gives higher yields of sugar or sugars of higher purities.

The reactions involved are basically:

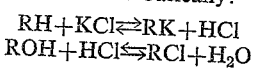

where R represents the resin with its functional group while potassium and chlorine have been indicated arbitrarily as the ions present in the contaminated juice.

This purification, however valuable, has to contend with a number of drawbacks.

Natural sugar juices of any kind of origin contain a certain proportion of nonionic matter in suspension and solution. This nonionic matter has the tendency to clog the ion exchange beds mechanically and to isolate the ion exchange particles. This, of course, results in a lower efficiency of the ion exchanger and consequently the ion exchanger has to be regenerated more frequently which in turn makes the procedure more expensive and time-consuming.

The regeneration of the ion exchanger is carried out by a strong acid and a strong base. Both regenerants are costly and have to be handled with care because of their dangerous nature.

Exchange of the cations for hydrogen results in inversion of sucrose and costly precautions have to be taken to prevent it.

It is therefore a further object of this invention to overcome the drawbacks referred to and to provide a process wherein nonionic matter is removed prior to the ion exchange procedure proper.

It is yet another object of this invention to defecate sugar juice in such a manner so as to eliminate those non-polar impurities which would tend to impair the efficiency of the ion exchange procedure.

In many ion exchange processes the exchange of the cations and/or anions results in a solution rich in different cations and anions which in turn may be undesirable, thus defeating the very purpose of the exchange.

It is therefore a further object of this invention to provide an ion exchange process for removing cationic and anionic impurities from a liquid, wherein the resulting liquid is substantially free from undesired cationic and anionic components.

It is a further object of this invention to defecate sugar juice without adding to the load of ionic matter originally present in the juice.

Another object of this invention is to provide a process for defecating sugar juice in a two-step procedure whereby nonionic and a portion of the polar impurities are removed in the first step, while the remaining ionic or polar impurities are exchanged in the second step, without enriching the juice on ionic matter.

A further object of this invention is to provide a process for exchanging cationic and anionic impurities in a solution or liquid, which is exceedingly simple to carry out, and wherein inexpensive and readily available raw materials are used.

Generally, it is an object of this invention to improve on the art relating to ion exchange processes for the removal of undesired contaminants from liquids.

Briefly, and in accordance with this invention, a liquid or solution containing cationic and anionic contaminants is purified by establishing ion exchange contact between the liquid and a cation exchange material the functional group of which is constituted by alkaline earth metal ions and an anion exchange material charged with OH. The cationic contaminants in the liquid are thus exchanged for alkaline earth metal while the anionic constituents are exchanged for hydroxyl. The alkaline earth metal in the solution is then precipitated and removed from the liquid.

In a preferred embodiment of this invention the alkaline earth metal is calcium so that the cation exchange material and the anion exchange material are both charged and regenerated with calcium hydroxide. An exchange bed will thus result which is in the calcium form. Depending on the nature of the contaminated liquid to be purified, the calcium hydroxide in the exchange bed will either be dissolved by the liquid, in which case the calcium is precipitated out in the form of an insoluble salt, such as calcium carbonate, phosphate or the like, or, as in the case of brackish water, the sodium in the brackish water will be replaced by calcium while the chloride in the water will be replaced by hydroxide whereafter the calcium hydroxide thus present in the solution after the ion exchange will precipitate and be removed by physical means such as filtration or centrifuging.

If the solution to be purified contains an appreciable amount of nonionic matter which may tend to clog the ion exchange bed and thus reduce its efficiency, such nonionic matter may first be removed in a suitable manner, for example, by contact with a clay e.g. bentonite.

The invention will now be described in connection with several examples. It should be understood, however, that these examples are given by way of illustration and not by way of limitation and that many changes and alterations may be effected in, for example, quantities, choice of material and process conditions in general without departing in any way from the scope and spirit of this invention as recited in the appended claims.

*Example 1*

1000 ml. of blackstrap molasses, diluted to 22° Brix, were defecated by adding to the liquor 10 ml. of bentonite in a 6 percent suspension. The mixture thus obtained was heated to 65° centigrade and 5 ml. of a flocculating agent were added. The flocculating agent was a product known in the trade as Separan. It was added in the form of a .05 percent solution, in three increments. The resultant material was left to cool to room temperature. A precipitate settled out and the clear liquid was drawn off. This liquid was substantially purer than the starting material.

The clear liquid was percolated through a column packed both with a strong base anion exchanger and a strong acid cation exchanger charged with calcium hydroxide.

The effluent material was carbonated with gaseous carbon dioxide to precipitate calcium carbonate and filtered.

An analysis of the filtered product revealed that the potassium content calculated on the original potassium content in the molasses was diminished by 96 percent while virtually all anionic impurities had been eliminated.

The reaction may be illustrated by the following formula:

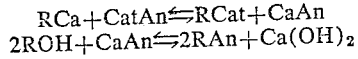

$$RCa + CatAn \rightleftharpoons RCat + CaAn$$
$$2ROH + CaAn \rightleftharpoons 2RAn + Ca(OH)_2$$

where R represents the ion exchanger with its functional group, Cat the cation entering the reaction and An the reacting anion.

*Example 2*

1000 ml. of a raw sugar solution at 35° Brix was defecated by the addition of 10 ml. of a 6 percent aqueous suspension of clay, such as for example bentonite and a subsequent addition of 5 ml. of a 0.05 percent solution of a flocculating agent, e.g. Separan, at 75° centigrade. The hot solution was filtered and subjected to ion exchange treatment on an ion exchange mixed resin bed charged with calcium hydroxide so as to obtain an effluent in which the entire ionic content was present in the form of calcium hydroxide. The effluent liquid was carbonated and filtered and was found to be essentially free from ionic impurities.

*Example 3*

1000 ml. of cane juice at 18° Brix was defecated by addition of bentonite and Separan. The clear partially purified liquid was decanted and percolated through a mixed bed of cation and anion exchangers, the functional groups of which were saturated with Ca and OH ions, respectively. The effluent was carbonated and having been found to be essentially free of ionic impurities, and after centrifugal separation of calcium carbonate, was percolated through a cation exchange column containing a weakly cross-linked sulfonated polystyrene resin in the hydrogen form. The effluent was thereafter percolated through an anion exchange column and the final product, as emerging from the latter column, was found to consist of sucrose, glucose, fructose and water only. All impurities, including nitrogenous substances and color, were eliminated.

*Example 4*

1000 ml. of crude beet diffusion juice were adjusted to pH 5.5. 10 ml. of a 6 percent aqueous suspension of bentonite were added and the slurry obtained was flocculated by addition of Separan. The clarified liquid was decanted and percolated through a column packed with a mixture of cation and anion exchange resins previously regenerated with water of lime. The percolate was carbonated to phenolphthalein neutrality and filtered. Analysis revealed absence of ionic impurities.

The filter cake obtained was heated and the CaO thus obtained used as regenerant for the next exchange cycle.

*Example 5*

A column, 19 mm. in diameter and 380 mm. high, was filled with a mixture consisting of 50 ml. sulfonic type cation exchange resin (known in the trade as "Duolite C-20") and 50 ml. polystyrene quaternary ammonium anion exchange resin (known in the trade as "Amberlite 410"). The resin bed was charged by upflow passage of a 3% slurry of calcium hydroxide in sea water.

Sea water, collected at the Berkeley shore of San Francisco Bay and reading 8500 p.p.m. Na, was passed upflow through the mixed bed at an 8:1 flowrate. The first 200 ml. of the effluent were filtered and analyzed for its sodium content which was found to be 2200 p.p.m. Subsequently, the same effluent was passed upflow through an identical column of mixed resins freshly charged with Ca(OH)$_2$, then filtered and again analyzed for sodium content which read 550 p.p.m. Na.

As calcium hydroxide is formed as a result of the ion exchange, the question may be raised why the relatively insoluble calcium hydroxide does not clog the column. In this connection it should be noted that while sodium chloride passes upflow through the bed and becomes substituted by calcium hydroxide or another alkaline earth metal hydroxide, it is not confined within a rigid structure. The entire bed is, so to say, fluidized, that is, the resin particles do not rest firmly but float within the system. Since the freshly formed hydroxide has not been subjected to any mechanical stress and exhibits and presents a very large surface area relative to its specific gravity it is therefore carried by the flow with much more ease than is the resin. This phenomenon may be compared to what takes place in gold panning.

*Example 6*

A column, 19 mm. in diameter and 380 mm. in height, was filled with a mixture consisting of 50 ml. sulfonic type cation exchanger (Duolite C-20) and 50 ml. strong anion exchanger (Duolite A-102). The column was charged by upward passage of a 3% slurry of Ca(OH)$_2$ in water at room temperature. Sea water, collected at the Berkeley shore of San Francisco Bay, was passed upflow through this column at a flow rate of 8 bed-volumes per hour. The effluent emanating from the column was carbonated to phenolphthalein neutrality, and the carbonate thus formed was filtered off. The filtrate was passed through an identical mixed column, freshly charged or regenerated by a $Ca(OH)_2$ slurry in water, and the collected effluent was analyzed for sodium contents. It contained 75 p.p.m. Na.

*Example 7*

Equal volumes of sulfonic-type cation resin and quaternary ammonia anion resin were mixed in a glass column, 380 mm. in height and 19 mm. in diameter, and charged with a slurry of $Ca(OH)_2$ in water, in a manner similar to that described in Examples 5 and 6. A solution of brackish water was prepared in the laboratory by adding sodium chloride to tap water to a salinity of 5000 p.p.m. The brackish solution was passed upflow through the charged mixed resin bed, whereafter the effluent was collected. The first 500 ml. of the effluent were carbonated by permitting air to bubble through the solution. Upon reaching neutrality, the precipitation from the solution was filtered off. The filtrate was again subjected to ion exchange treatment on a mixed resin column identical with that described above which was freshly charged or regenerated with a $Ca(OH)_2$ slurry. Upon analysis, the final effluent read 350 p.p.m. NaCl.

*Example 8*

50 ml. of sulfonic cation resin were thoroughly mixed with 50 ml. of quaternary ammonia anion resin in a glass column 19 mm. in diameter, and charged with a slurry of $Ca(OH)_2$ in a manner similar to that described in Examples 5–7. A dextrose solution consisting of 1500 ml. of acid-converted, coagulated and filtered hydrolyzate having a 0.20% ash content (sulfated, dry basis) at 10 Bé. was passed downflow through the mixed resin bed, at a flow rate of 16 bedvolumes per hour and at a temperature sufficiently low so as to avoid browning. The effluent was collected, carbonated by $CO_2$ gas, and filtered to separate the precipitated carbonate. The filtrate contained but 0.06% ash. Repeated passage of this filtrate through a freshly charged mixed resin bed, followed by carbonation and filtration in the same manner resulted in a final filtrate reading 0.02% ash, and having a density of 8.3 Bé. The treatment on the $Ca(OH)_2$ cycle ion exchange resulted in 85% color removal.

*Example 9*

2000 cc. San Francisco Bay sea water, containing 2.22% of NaCl, were passed downflow through a column of 625 ml. cation exchange resin ("Duolite C-25" which is a polystyrene sulfonic resin) in $Ca^{++}$ form. The calcium chloride containing effluent was shaken with a solution of 315.5 grams of ethylenehexadecyldimethylammonium hydroxide, prepared by reacting 378.5 grams of ethylenehexadecyldimethylammonium bromide (as furnished by Eastman) with excess sodium hydroxide. Light commercial lubricating oil was employed as the solvent. The following reaction presumably took place:

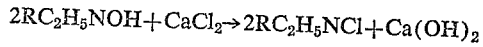
$$2RC_2H_5NOH + CaCl_2 \rightarrow 2RC_2H_5NCl + Ca(OH)_2$$

The precipitated calcium hydroxide was removed by filtration. The filtrate was centrifuged and separated into two layers:

(a) The aqueous phase consisting of a solution of approximately 0.15% $Ca(OH)_2$ in water;

(b) The oil phase containing the solvent and the quaternary ammonium compound.

The calcium in the aqueous phase was precipitated out as calcium carbonate, by permitting air to bubble through the solution. Upon filtration, the filtrate was percolated through a resin bed consisting of a mixture of 1.77 parts of cation resin ("Duolite C-20") and 1.00 part of anion resin ("Duolite A-30") which bed had been regenerated with sea water. The effluent was analyzed and read 170 p.p.m. NaCl.

The oil phase was shaken with one liter of a 4% slurry of calcium hydroxide, which brought the quaternary ammonium salt to the free base form, ready to be used in the next cycle. The formed calcium chloride, together with the dissolved parts of $Ca(OH)_2$, were employed in the regeneration of the cation resin bed ("Duolite C-25"). The undissolved excess of calcium hydroxide was collected for future use.

*Example 10*

A column, 2″ in internal diameter and 50″ high, was filled to half its capacity with an equimolar mixture of "Duolite C-20" and "Duolite A-101" and exhausted and spent by passing through it a 3% solution of sodium chloride, until the composition of the effluent equaled that of the influent. Once fully exhausted, the column was allowed to drain dry. A 6% slurry of magnesium hydroxide in a 3% solution of sodium chloride was introduced at the top of the column and the resin contained in the column was agitated with the slurry by bubbling air through the system. The agitation was carried out for ten minutes. The column was allowed to drain and a second charge of the slurry was introduced to the top and the resin was agitated again. The column, which now was in the Mg and OH form respectively was drained and was ready for the service run.

A 3% solution of sodium chloride was introduced from the bottom of the column upflow at a flow rate of four bed volumes per hour. The effluent liquid was collected and after sedimentation and filtration analyzed for sodium. The flame photometric reading was 220 p.p.m.

In connection with Example 10 the question may be raised how the practically insoluble magnesium hydroxide reacts with the resin. Extensive experiments have shown that the answer to this question may be found in the fact that the resin removes magnesium from the solution, thus constantly shifting the equilibrium and allowing more and more of the compound to dissolve. This phenomenon is especially remarkable in the case of a mixed bed. In this connection reference is had to Honda, Yashino and Wabiko, Journal of Chemical Society of Japan, Pure Chemistry Section, volume 33, page 348, where the authors describe dissolving barium sulphate by contacting it with a mixture of cation and anion exchange resins. One of the resins has to be a strong resin, that is, it has to exhibit salt splitting capacity.

From the above description it will be realized that the invention provides for a very advantageous and simple process for removing undesired contaminants from liquids and solutions such as, for example, sugar juice, molasses or brackish or salt water.

Considering one aspect of the invention, the inventive process provides for a one-step process for substituting or exchanging undesired cations and anions in the liquid by an alkaline earth metal hydroxide, e.g. calcium hydroxide which is easily removed from the liquid by precipitation. Thus the liquid to be refined is not enriched by other cationic or anionic constituents, but the original ionic components are removed.

As has been pointed out before, the inventive process may be carried out with any suitable alkaline earth metal although for practical purposes calcium and magnesium are preferred since Ca and Mg compounds are relatively inexpensive.

A wide variety of ion exchange resins may be used. Some have been indicated, in connection with the examples; however, it should be pointed out that the ion exchange resins which have been identified by their trade names can certainly be replaced by different ones, as the invention does not reside in the use of any particular ion exchange resin. Both weakly and strongly acid or base ion exchange resins come into consideration.

Example 9 describes a modification of the process wherein the exchange of the anionic constituent is effected by a liquid ion exchange material. Such modification may have advantages under certain circumstances, depending on the prevailing conditions and the nature of the liquid to be purified. Applicants do not wish to be limited to the quaternary ammonium compound used as exchange material in Example 9 as, of course, many other similar compounds may be employed for the purpose in question. Thus, for example, dialkyldimethyl ammonia is insoluble in water but soluble in oils or organic solvents and thus would be applicable to the inventive process. Other such quaternary ammonia compounds which would be suitable for the inventive process are the following:

Dioctadecyldimethyl ammonium chloride
Octadecyloctadecenylmethylethyl ammonium chloride
Dioctadecylhexadecylmethyl ammonium chloride
Hexadecyloctadecylmethylisopropyl ammonium chloride

What is claimed is:

1. A process of removing cationic and anionic contaminants from a liquid, which comprises establishing ion exchange contact between the liquid and cation and anion exchange material regenerated with an alkaline earth metal and hydroxyl, respectively, thereby to exchange the cationic contaminants for alkaline earth metal and the anionic contaminants for hydroxyl, precipitating the alkaline earth metal, and removing the precipitate from the liquid.

2. A process for removing cationic and anionic contaminants from a liquid, which comprises passing the liquid through a zone containing cation and anion exchange resin regenerated with alkaline earth metal and hydroxyl, respectively, thereby to exchange the cationic contaminants for alkaline earth metal and the anionic contaminants for hydroxyl, precipitating the alkaline earth metal in the liquid, and removing the precipitate from the liquid.

3. A process for removing cationic and anionic contaminants from a liquid, which comprises regenerating a mixed bed of anion exchange resin and cation exchange resin with calcium hydroxide, passing the liquid through said bed, whereby the cationic and anionic contaminants are exchanged for calcium hydroxide, and removing the calcium hydroxide from the liquid.

4. A one-step process as claimed in claim 3, wherein said calcium hydroxide is physically separated from the liquid.

5. A one-step process as claimed in claim 3, wherein said calcium hydroxide is first precipitated and then removed from the liquid.

6. A process for removing cationic, anionic and non-ionic contaminants from a liquid, which comprises contacting the liquid with a clay, removing the clay from the liquid, passing the liquid thereafter through a zone containing cation and anion exchange resin regenerated with alkaline earth metal hydroxide, thereby to exchange the cationic contaminants for alkaline earth metal and the anionic contaminants for hydroxyl, precipitating the alkaline earth metal in the liquid and removing the precipitate from the liquid.

7. A process for removing cationic, anionic and non-ionic contaminants from a liquid, which comprises contacting the liquid with bentonite and a flocculating agent at elevated temperature, separating clear liquid from the mixture thus obtained, passing the clear liquid through a zone containing cation and anion exchange resin regenerated with alkaline earth metal hydroxide, thereby to exchange the cationic contaminants for alkaline earth metal and the anionic contaminants for hydroxyl, precipitating the alkaline earth metal in the liquid and removing the precipitate from the liquid.

8. An ion exchange cycle for purifying liquids from cationic and anionic contaminants, which comprises regenerating a mixed bed of cation and anion exchange resin with an alkaline earth metal hydroxide, passing the liquid to be purified through said bed, thereby to exchange the cationic contaminants for alkaline earth metal and the anionic contaminants for hydroxyl, respectively, regenerating the bed by passing a fresh amount of alkaline earth metal hydroxide solution through said bed, precipitating alkaline earth metal from said liquid and passing a new charge of liquid to be purified through said regenerated bed.

9. A process for removing cationic and anionic contaminants from brackish water such as sea water, which comprises passing the water through a zone containing cation and anion exchange resin regenerated with alkaline earth metal hydroxide, thereby to exchange the cationic contaminants in the water for alkaline earth metal and the anionic contaminants for hydroxyl, and removing alkaline earth metal containing precipitate from the water.

10. A process of removing cationic and anionic contaminants from a liquid, which comprises establishing ion exchange contact between the liquid and a solid cation exchange material regenerated with alkaline earth metal ions, thereby to exchange the cationic contaminants for alkaline earth metal, establishing ion exchange contact between the liquid and a liquid anion exchange material to exchange the anionic contaminants in the liquid for hydroxyl, precipitating alkaline earth metal hydroxide from the solution, and removing the precipitate.

11. A process as claimed in claim 10, wherein said alkaline earth metal is calcium.

12. A process for removing cationic and anionic contaminants from sea water which comprises passing the sea water through a cation exchange column in the calcium form, whereby a calcium chloride containing aqueous solution is obtained, contacting this solution with a liquid anion exchange material in the OH form and insoluble in water, whereby the calcium chloride is converted into calcium hydroxide, precipitating the calcium hydroxide from the aqueous solution and separating the precipitate from the solution.

13. A process for removing anionic and cationic contaminants from a liquid, which comprises exhausting a column containing anion and cation exchange resin with sodium chloride, regenerating the column with an aqueous suspension of magnesium hydroxide, passing liquid to be treated through the column whereby the cationic contaminants are replaced by magnesium and the anionic contaminants by hydroxyl, precipitating the magnesium hydroxide formed and removing the magnesium hydroxide from the liquid.

14. A process for rendering soluble ionic contaminants in a liquid insoluble, which comprises establishing ion exchange contact between said liquid and a zone of cation and anion exchange material regenerated with an alkaline earth metal hydroxide, exchanging the ionic soluble contaminants for said alkaline earth metal hydroxide, precipitating said alkaline earth metal hydroxide from the liquid and separating the precipitate from the liquid.

15. A process as claimed in claim 14, wherein the alkaline earth metal hydroxide is calcium hydroxide.

16. A process as claimed in claim 14, wherein the alkaline metal hydroxide is magnesium hydroxide.

References Cited in the file of this patent

UNITED STATES PATENTS

| | | |
|---|---|---|
| 2,216,754 | Sanchez | Oct. 8, 1940 |
| 2,507,992 | Payne | May 16, 1950 |
| 2,564,820 | Smit | Aug. 21, 1951 |
| 2,578,938 | Kunin | Dec. 18, 1951 |